Dec. 15, 1959 W. J. CALDWELL 2,916,751

WIRE BRUSHING MACHINE FOR COIL LEADS

Filed Dec. 15, 1954 8 Sheets-Sheet 1

INVENTOR.
WASHINGTON J. CALDWELL
BY
Falvey, Souther & Stoltenberg

Dec. 15, 1959 W. J. CALDWELL 2,916,751

WIRE BRUSHING MACHINE FOR COIL LEADS

Filed Dec. 15, 1954 8 Sheets-Sheet 2

INVENTOR.
WASHINGTON J. CALDWELL
BY
Falvey, Souther & Stottenberg

WIRE BRUSHING MACHINE FOR COIL LEADS

Filed Dec. 15, 1954 8 Sheets-Sheet 3

INVENTOR.
WASHINGTON J. CALDWELL
BY
Falvey, Souther & Stoltenberg

WIRE BRUSHING MACHINE FOR COIL LEADS

INVENTOR.
WASHINGTON J. CALDWELL
BY
Falvey, Souther & Stoltenberg

Dec. 15, 1959 W. J. CALDWELL 2,916,751

WIRE BRUSHING MACHINE FOR COIL LEADS

Filed Dec. 15, 1954 8 Sheets-Sheet 5

INVENTOR.
WASHINGTON J. CALDWELL
BY
Falvey, Souther & Stoltenberg

Dec. 15, 1959 W. J. CALDWELL 2,916,751

WIRE BRUSHING MACHINE FOR COIL LEADS

Filed Dec. 15, 1954 8 Sheets-Sheet 6

INVENTOR.
WASHINGTON J. CALDWELL
BY
Falvey, Souther & Stoltenberg

INVENTOR.
WASHINGTON J. CALDWELL
BY
Fabrey, Souther & Stoltenberg

WIRE BRUSHING MACHINE FOR COIL LEADS

Filed Dec. 15, 1954 8 Sheets-Sheet 8

INVENTOR.
WASHINGTON J. CALDWELL
BY
Falvey, Souther & Stoltenberg

United States Patent Office 2,916,751

Patented Dec. 15, 1959

2,916,751

WIRE BRUSHING MACHINE FOR COIL LEADS

Washington J. Caldwell, Toledo, Ohio

Application December 15, 1954, Serial No. 475,375

12 Claims. (Cl. 15—21)

This invention relates to wire scratch brushing machines, more particularly to a wire scratch brushing machine for removing the insulation from the terminal ends of a prewound coil, so that the coil is suitable for positioning in the armature of a dynamoelectric machine.

In the past, the insulation from the terminal leads of a prewound armature coil for an electromagnetic machine, such as a generator for automotive use, has had the insulation removed from the lead terminal tips, both cotton and enameled insulation, by manual manipulation wherein the insulated lead ends were brought into contact with a rotating scratch brush in a fixture handled manually by an operator. This operation was unsatisfactory and costly. The coils issuing from the manual operation, in many cases, were improperly cleansed, so that some of the insulation still remained on portions of the lead wires which, at a later time, were inserted in slots cut in the commutator bars with the result that when soldering operations were performed to connect the terminal lead to the commutator bar, the remaining insulation would not allow a good soldered joint to be made. The result was a rejected armature, due to the poor electrical connection to the commutator which would need reworking, and added substantially to the cost of manufacture of the part.

The present invention contemplates the provision of a machine which removes both cotton and enameled insulation from the lead terminal ends of a series of prewound coils in a uniform manner, so that each coil is cleansed to substantially the same point with the result that very few rejects in the final assembly line arise due to faulty soldered connections with the commutator to which the terminal ends are connected.

The invention further contemplates the provision of a method of guiding the free terminal ends of a prewound armature coil for an electromagnetic machine wherein the lead ends are automatically separated and urged against a rotating wire scratch brush in a single layer whereby it is assured that the insulation from each lead will be fully removed to attain the uniform cleansing of the insulation. The method contemplates a machine which provides the means for preventing blanketing of leads to assure each terminal lead end is subjected to the same cleansing action.

This invention further contemplates the provision of a wire scratch brushing machine which will uniformly remove the insulation from the leads of a pre-wound coil and at the same time manipulate the leads in a manner so as to provide a uniform series of coils wherein the leads already cleansed by the scratch brush are juxtaposed in uniform relation with reference to the body of its coil, with the result that the coils are suitable for use in a machine which will position the lower coil side automatically in the slots of an armature, the machine being provided with lead-connecting devices to position the terminal leads in the slots in the commutator, all as described in application Serial No. 409,078, filed by the applicant and assigned to the same assignee, which matured into Patent No. 2,867,896, issuing January 13, 1959.

This invention further contemplates the provision of a machine wherein a wire scratch brush rotating at high speed removes the insulation from the lead terminal tips of a prewound coil by friction rather than by a cutting action, so that the scratch brush does not rely upon sharp cutting edges to remove the insulation but rather upon the heat, generated by the friction to first char the insulaion and thereafter remove the charred insulation by abrading, so that the copper wire of the lead is cleansed but not substantially reduced in size.

It is, therefore, a principal object of this invention to provide a wire scratch brushing machine which is suitable for removing the insulation from the free terminal leads of a prewound coil which is to be used in connection with an electromagnetic machine.

It is a further object of this invention to provide a machine which will manipulate the free terminal leads of a prewound coil for use in an electromagnetic machine so as to present the leads to a rotating scratch brush in a single layer to assure uniform cleansing contact of the leads to the scratch brush without blanketing, whereby the insulation is uniformly removed from the leads.

It is a further object of this invention to provide a method of removing the insulation from the free terminal leads of prewound coils positioned in lots on the holder, whereby each lead is subjected uniformly to the action of the rotating scratch brush without blanketing of leads, whereby uniform cleansing action of the rotating scratch brush is applied to all of the terminal leads of the coils in the lot.

It is a further object of this invention to provide a scratch brush machine for removing the insulation from the terminal tips of prewound coils which manipulates the free coil lead terminals in a series of coils mounted on a holder, so that the coils are of absolutely uniform conformation to be suitable for use in automatic machines in a mass production line which positions the lower coil sides in the slots of a generator armature including the step of connecting the lower coil leads to the slots of the commutator bars.

It is a further object of this invention to provide a cleansing machine utilizing a rotating wire scratch brush to remove insulation from the free terminal tips of a prewound coil suitable for use in an electromagnetic machine, which relies upon friction rather than sharp cutting edges to remove the insulation from the wire tips by first burning or charring the insulation and then finally abrading to remove the charred insulation from the lead terminals.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figures 1, 2, 3:
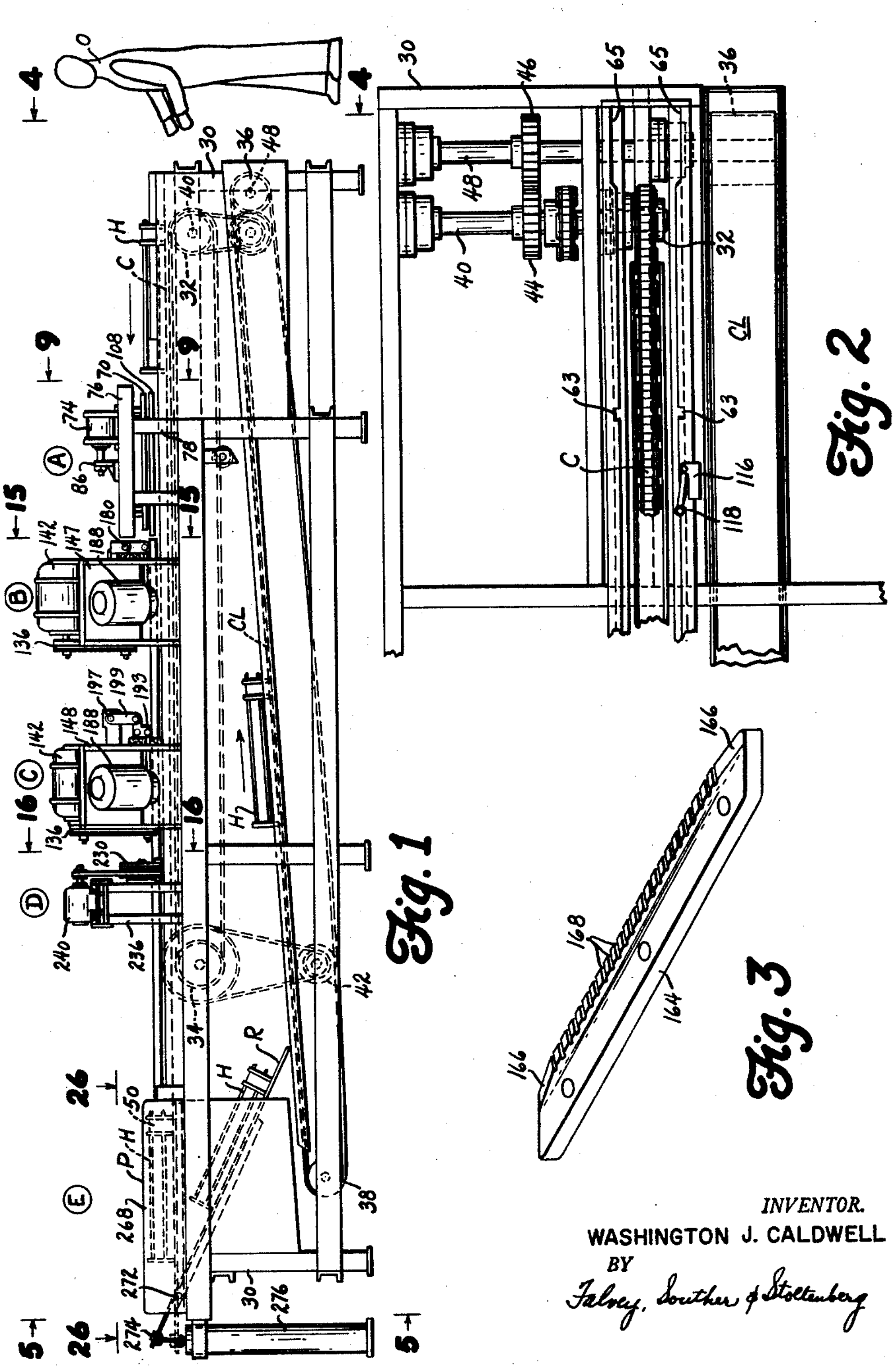
Fig. 1 is a side elevation of the machine incorporating the invention.
Fig. 2 is a plan view of a portion of the conveyor active longitudinally of the machine.
Fig. 3 is a perspective view of the advancing mechanism which applies the free terminal leads of the prewound coil in a single layer to a rotating scratch brush.
Figure 4:
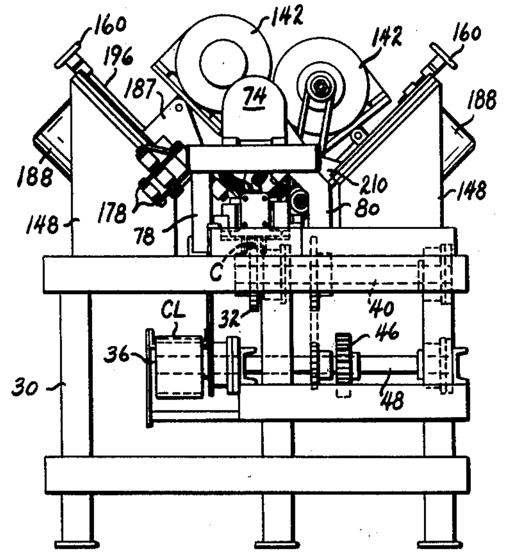
Fig. 4 is a front end elevational view taken along the line 4—4 of Fig. 1.
Figure 5:
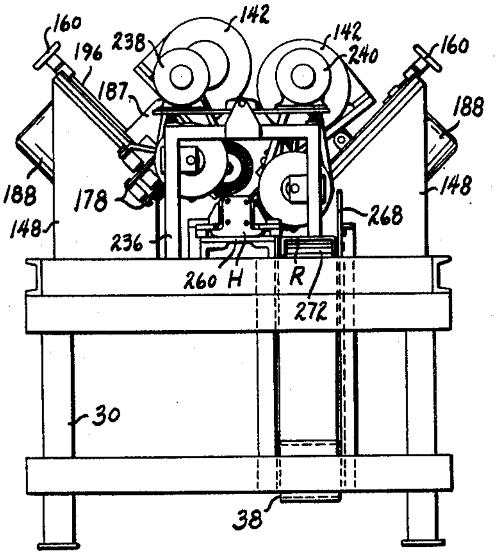
Fig. 5 is a rear end elevational view taken along the line 5—5 of Fig. 1.

In the past, scratch brushes have been utilized for cleansing insulation from the terminal leads of prewound coils, usually by manually manipulating a group of coils on a holder and applying the coil terminal or lead tips directly against the rotating scratch brush which had its bristles sharpened, so that the insulation was removed by a cutting action within a very short period of time. When the scratch brush became dull, and no longer had sharp cutting edges to remove the insulation, the direction of rotation of the scratch brush was reversed or the scratch brush was removed from the rotating arbor and applied to a grinding device to resharpen the bristles. For this reason, constant changing of the scratch brush was necessary for the successful operation of the cleansing of the terminal tips of the coils. Furthermore, the manual manipulation of the holder, upon which was positioned a group of the coils, created a variable condition which resulted in bent coil leads with reference to the coil body to random positions and made the coils unsuitable for use on automatic machinery in a production line.

The machine about to be described, incorporating the invention, utilizes a scratch brush which does not depend upon the sharpened condition of the ends of the bristles of the rotating scratch brush to remove the insulation from the terminals of the coils. It is preferable to avoid sharp edges on the tips of the scratch brush bristles, inasmuch as the present machine contemplates using a dull scratch brush continuously until worn out, which acts largely by friction with the terminal leads of the coils, to raise the temperature thereof until a charring occurs, particularly with enamel insulation on the wire of the coil. This condition of operation obviates reversal of rotation or stoppage of operation to allow sharpening. The dull scratch brush still provides sufficient abrading action to remove the charred insulation from the copper wire of the terminal lead without materially reducing the dimension of the copper wire which would obtain if a sharp scratch brush were used. Furthermore, the use of scratch brushes having relatively large diameter is made allowable with the result that sharper boundaries are obtainable between the insulated and cleaned regions, particularly with the reciprocation of the leads when within the operable region of the scratch brush as contemplated by the present machine.

At the same time, the machine provides a mechanism whereby the terminal leads of the prewound and taped coils are presented to the scratch brushes in a single layer, so that the charring and abrading action is uniformly applied to each wire of the terminal leads of the coil, with the result that uniform cleansing action is obtained through a whole series of coils in a production line. At the same time, the machine provides a mechanism which bends the terminal leads of the coil to uniform angular relation with reference to the body of the coil, so that the relative position of the terminal leads is juxtaposed in uniform relation with the coil body for all the coils as they issue from the machine. This allows the coils to be used in automatic machinery at a further point in mass production lines inasmuch as the leads are not in random position with reference to the coil bodies as found in the earlier manual manipulation but are absolutely uniformly disposed, which is a condition precedent, necessary for the successful operation of automatic machines.

Turning now to the drawings, particularly to Fig. 1, which shows a side elevation of the machine, it will be noted that two conveyor systems are provided to carry a coil holder H through the machine wherein an operator O, standing at the right end of the machine, is capable of loading the machine by placing the holder H filled with coils K in horizontal position at the right end of the machine on a chain conveyor C which moves it to the left through the machine until it arrives at the far left end where a transfer mechanism, to be described hereinafter, moves the holder on to a ramp R which tilts downwardly under the weight of the holder to convey the holder to the lower belt conveyor CL which then moves the holder back to the right end of the machine where it is capable of being unloaded by the operator O. A frame-work 30 is provided which mounts the conveyors C and CL by means of sprockets 32 and 34 for the upper conveyor C and rollers 36 and 38 for the lower conveyor CL. The rollers 36 and 38 are mounted on suitable shafts journaled in bearings suitably positioned on the framework 30.

The upper conveyor C consists of a link chain which engages sprockets 32 affixed to a shaft 40. The chain is driven at the distal end by sprocket 34 which is suitably driven by an electric motor 42 affixed to the frame through a speed-reducing mechanism shown in phantom. The shaft 40, referred to above, is provided with gears 44 and 46 so as to drive shaft 48, to which is affixed roller 36 for driving the lower belt-like conveyor CL which returns the holders H to the forward end of the machine where they may be removed by the operator. In this way, the holder H, which may consist of four rods held in spaced parallel relation, as shown in detail in Figs. 6, 7, and 8, may be advanced by the chain conveyor C from the forward end of the machine through the different operating positions of the machine, to be described in detail hereinafter, to the rear of the machine where the transfer mechanism P, including the ramp R, moves the holder H to the lower conveyor CL which moves it back to the front end of the machine. It will be noted in Fig. 8 that the holder H is provided with a removable head 50 which has a depending rotatable lug 52 which, when the assembly is in horizontal position, drops into engagement with the various link cross-pins 54 of the conveyor C as is clearly shown in Fig. 8.

Figure 8:
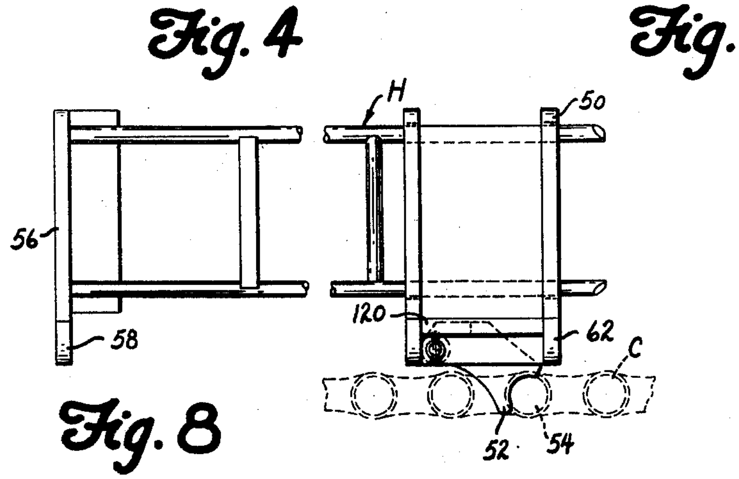
Fig. 8 is a side elevational view of the holder shown in Figs. 6 and 7 showing the driving means for moving the holder through the machine.
Figure 6:
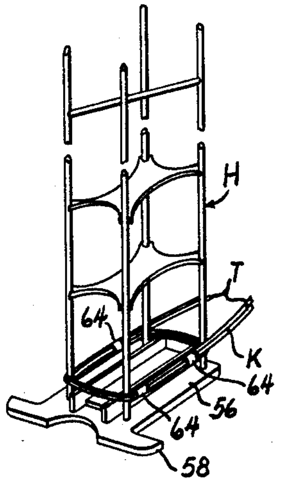
Fig. 6 is a perspective view of a holder for positioning the coils in groups or lots which carries the coils through the machine.
Figure 7:
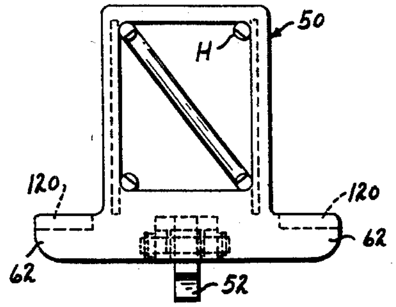
Fig. 7 is an end view of the holder taken from the right of Fig. 8.

The operator O places the coils K on the holder H substantially in the position shown in Fig. 6 with the four rods engaging the corners of the coil and loads the holder H with coils K, all in the same position to substantially the upper end thereof, whereafter he places the head member 50 in position over the coils, as shown in Fig. 8, and then places the loaded holder H in position on the machine, as shown in Fig. 1, at the forward end in a manner, so that the lug 52 contacts the cross-pin 54 of the conveyor chain C. The coils K are compacted together against a cross-plate 56 by the head 50 being pushed by the conveyor C.

Figures 15, 16, 17:
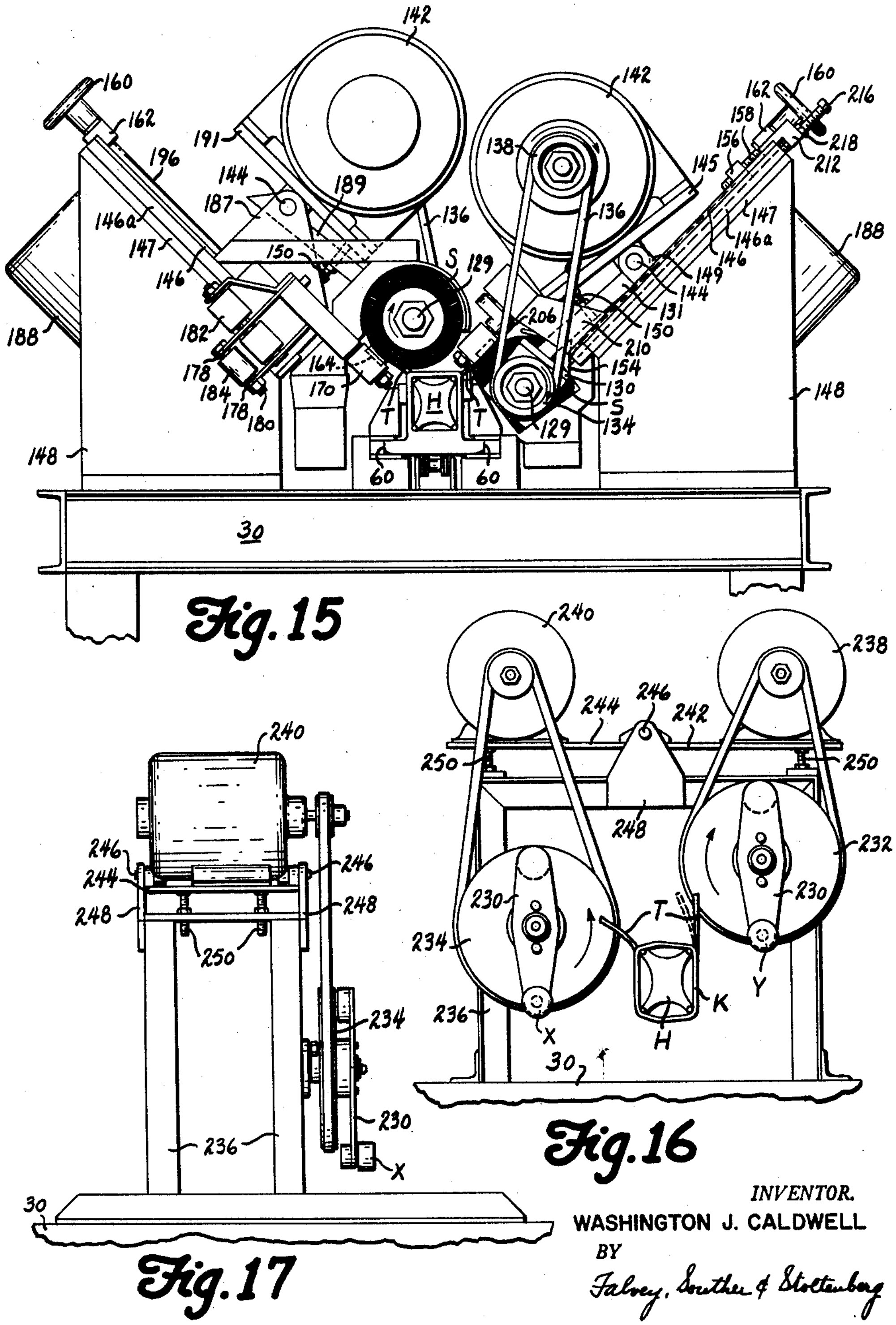
Fig. 15 is an end elevational view of one of the scratch brush driving mechanisms taken along the line 15—15 of Fig. 1.
Fig. 16 is an end elevational view taken along the line 16—16 of Fig. 1.
Fig. 17 is a side elevational view of the mechanism shown in Fig. 16.

The bottom or cross-plate 56 of the holder H is provided with laterally extending lugs 58 which engage guideways 60 formed along the upper surface of the framework 30, as is best seen in Fig. 15. In the same manner, the head 50 is provided with laterally-projecting portions 62 which also engage the guide-ways 60, so that the lug 52 engaging the link pin 54 is enabled to push the holder H in a substantially horizontal plane with the coils K positioned thereon with all the terminal leads projecting upwardly through the different operating positions of the machine. The laterally-extending lug portions 58 and 62 enter the guide-ways 60 by the slots 63 and cut away portions 65 in the overhang of the guides 60 as shown in Fig. 2.

Figure 9:
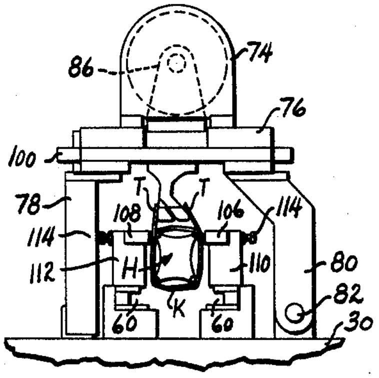
Fig. 9 is an end elevational view of a part of the machine taken along the line 9—9 of Fig. 1.

The coils K, as they come from the coil-winding machines, are provided with tape-holding elements 64 which hold the multi-turns of the two-wire coil in fixed relation with the terminals T pointing in the same direction from the coil in slightly converging relation. This is best shown in Figs. 6 and 9. The first operating position of the machine, as indicated by the letter "A" in Fig. 1, cooperates on the coil terminals T to thrust them simultaneously outwardly to a position about 90 degrees apart in a diverging relation, in which position they remain in proceeding through positions B and C which are scratch brush positions cleansing the terminal leads T of insulation and finally through operating position D which bends the terminal leads T back to substantially parallel relation with each other, and also in substantially parallel relation with the coil sides. Each coil K proceeding through position D and from the machine has its terminal leads T in substantially parallel relation which runs uniformly through a long series of coils.

The uniform relations of the coil leads in a long series is a condition precedent to their use in automatic positioning machines, which positions a side of these coils in the lower position in the slots of an armature which includes the step of gripping the lower coil lead and bending it to the required position with relation to a commutator of an armature and thereafter positioning it in the connecting slot of the commutator. A machine for this purpose is described in Patent No. 2,867,896 issued to the present applicant and assigned to the same assignee. The successful operation of the machine disclosed in this application requires the uniform relation between the terminal leads of the individual coils, which could not be attained by manual manipulation of the coils during the cleansing operation of the terminal leads. The mechanisms positioned at the various locations A, B, C, and D of the present machine will be described in detail hereinafter.

*Lead spreading device at station A*

Figure 10:
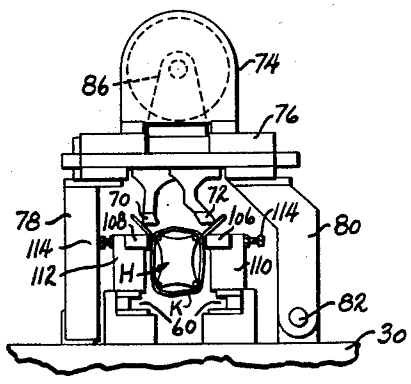
Fig. 10 is a view similar to Fig. 9 with the mechanism in another position.

In order to facilitate the operation of the wire scratch brushes located at positions B and C, it is essential that the terminal leads of the coils K which are positioned on the holder H in convergent position as they are produced by the winding machine, and generally shown in Fig. 9, be separated until they are in substantial right-angular relation with each other as shown in Fig. 10. A special apparatus is provided for this purpose comprising a pair of movable bars 70 and 72 which are normally in closely related parallel juxtaposition as shown in Fig. 9 but are capable of being separated by a suitable mechanism operable by an air cylinder 74 to a separated position as shown in Fig. 10, which provides the means for bending the wire leads of the group of coils positioned on the holder H simultaneously.

Figure 11:
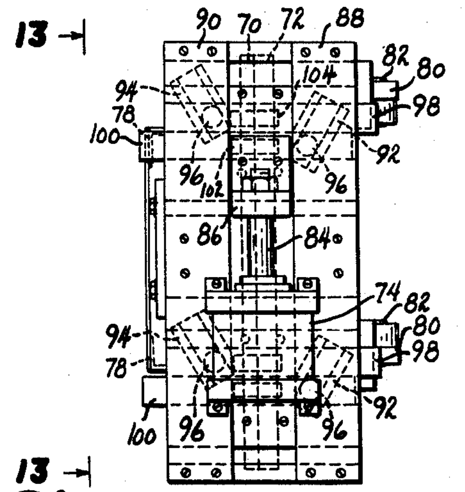
Figs. 11 and 12 are plan views of the device shown in Figs. 9 and 10 showing the juxtaposition of the parts in the same positions.
Figure 12:
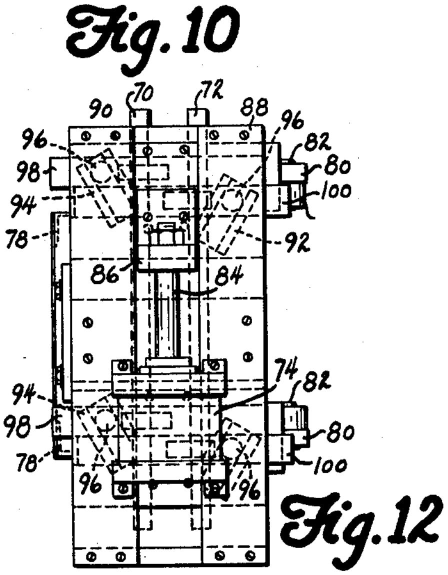
Figure 13:
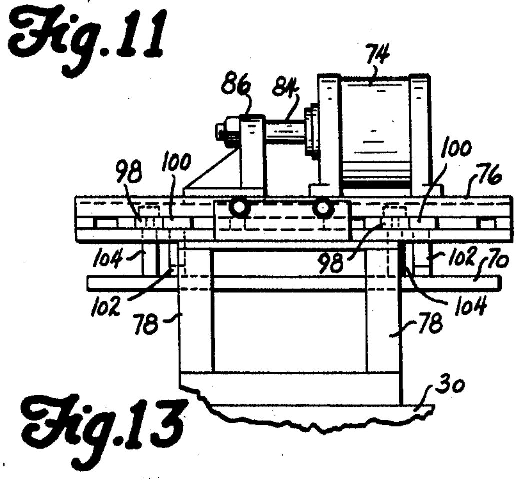
Fig. 13 is a side elevational view taken along the lines 13—13 of Fig. 11.
Figure 14:
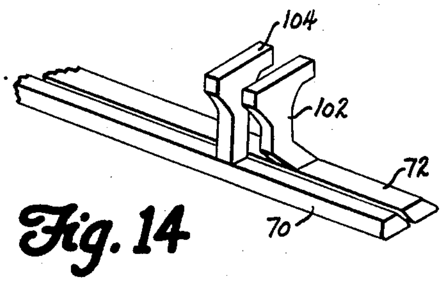
Fig. 14 is a perspective view of spreader bars for the terminal leads of the coil forming the active part of the mechanism shown in Figs. 9 to 13 inclusive.

The air cylinder 74 is mounted on a platform 76 which is supported on legs 78 and 80, the latter being pivotally positioned on the frame 30 whereby the whole assembly may be rotated about the pivot point 82, so that the mechanisms provided at other positions are available for adjustment or repair. In normal operating position, the separating mechanism is positioned as shown in Figs. 9 and 10. The piston of the air cylinder 74 is adapted to advance and retract the piston rod 84 as shown in Fig. 13 which has affixed to it bracket 86 guided for longitudinal movement between rails 88 and 90 suitably attached to the platform 76. The bracket 86 has attached to it on its lower side two sets of obliquely positioned guides 92 and 94 which are adapted to cooperate with pintles 96 attached to transversely slidable bars 98 and 100, so that as the bracket is moved to the left (Fig. 13), the pintles 96, cooperating with the guides 92 and 94, will thrust the slidable bars 98 to the right (Fig. 11), while the slidable bars 100 are thrust outwardly to the left. Inasmuch as the spreader bars 70 and 72 are integrally attached to the slide bars 98 and 100 by means of depending feet 102 and 104 respectively, the bars will be separated to the position substantially shown in Fig. 10. It will be noted that the initial position of the mechanism is shown in Figs. 9, 11, and 13 while the spread position or operative position of the mechanism is shown in Figs. 10 and 12 where the spreader bars 70 and 72 are in separated relation. In order to provide a support for the coil sides during the bending and spreading operation, anvils 106 and 108 are provided adjacent the point where the wire leads issue from the coil body as is best seen in Figs. 9 and 10. The anvils 106 and 108 are suitably supported on blocks 110 and 112 affixed to the upper surface of the guide rail 60, and are provided with bolts 114 for adjustment of the anvils to control their relation with the sides of the coil K whereby sufficient support is given to the coil sides during the bending operation to prevent undue stress on the tape-holding element 64 affixed to the coil and shown in Fig. 6.

Figure 28:
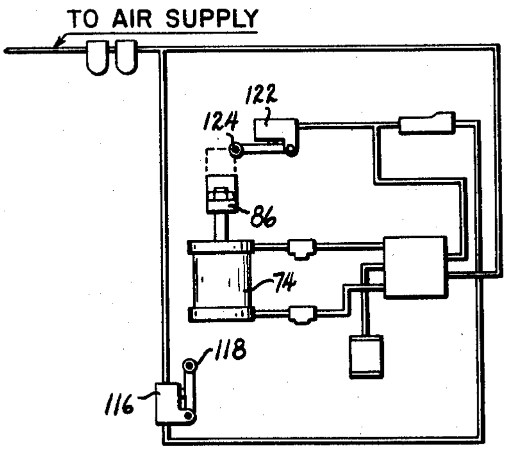
Figs. 28 and 29 are piping diagrams showing the connections of the air lines of some of the operating mechanisms for the machine.

The conduit circuits controlling the air supply to the air cylinder 74 are shown in Fig. 28, two valves being provided to control the advancement and retraction of the bracket 86. The first valve 116 is positinoed on the guide rails 60 as is best seen in Fig. 2, having a control lever provided with a roller 118 which extends into the path of a control lug 120 positioned on the side of the header member 50 as shown in Fig. 8. The second valve 122 controls the retraction of the bracket 86 by having its control lever provided with a roller 124 contacting the bracket 86 in its path of outward movement during the spreading operation as already described. When the bracket 86 contacts the roller 124 of the valve 122, air circuits are established which will retract the piston in the air cylinder to its fully retracted position. This valving mechanism and control device for the air cylinder 74 is standard in form and will not be described in further detail.

The procedures of spreading the leads of the coils in the group as mounted on the holder H being completed, the holder H is moved forwardly by the link chain conveyor C. The spreader bars 70 and 72, already described, are of sufficient length to cover all of the leads of the coil K positioned on the holder H, and each of the coils, by this mechanism, has its leads spread outwardly to substantially the position shown in Fig. 10. With the leads of the coils in this position, the holder H is continuously advancing and the forward coils on the holder H enter the locus of the mechanism in position B which will now be described.

*Scratch brushes positioned at stations B and C*

After the leads of the coil K have been separated to substantially the position shown in Fig. 10, while the holder H is being continuously advanced by the conveyor C, the coil group approaches station B from the right (Fig. 1) where the insulation on the upper side of the left-hand coil lead is removed by a scratch brush S (Fig. 15), while the insulation on the lower side right-hand lead is removed by a second rotating scratch brush, both scratch brushes rotating in a clockwise direction, so that the forces applied to the lead during the brushing operation are longitudinal to the wire and are directed outwardly from the coil.

Figures 22, 25:
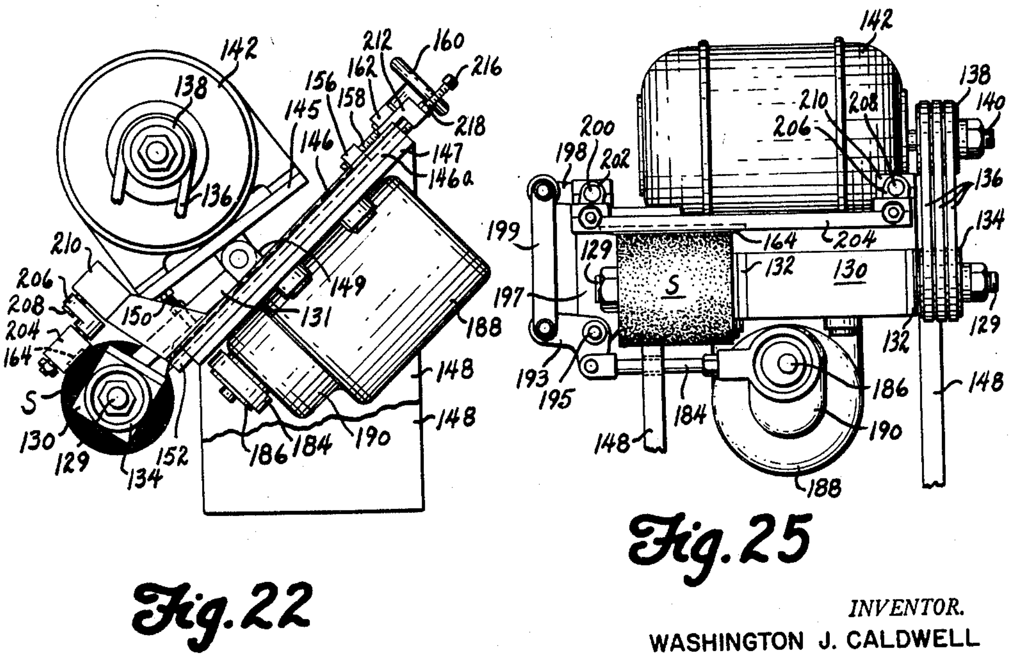
Fig. 22 is an end elevational view of one of the scratch brush driving means and operating mechanism for cleansing the bottom side of the terminal leads.
Fig. 25 is a side elevational view of the mechanism shown in Fig. 24 taken along the line 25—25 of Fig. 24.

The scratch brush on the left (Fig. 15) is mounted on a shaft 129, positioned substantially parallel to the axis of the conveyor C and is journaled in a horizontal sleeve 130 mounting spaced ball bearing in its interior (Fig. 25). The sleeve 130 is provided with sleeve plates 132 adjacent its ends to protect the bearing from dirt and grit. At the right end of the shaft, sheaves 134 are provided which are in driving relation with belts 136 engaging similar sheaves 138 mounted on a shaft 140 of a powerful electric motor 142 which drives through the described mechanism the scratch brush S at a relatively high speed, preferably in direct speed ratio. The bearing sleeve 130 and also the motor 142 are adjustably mounted on plates 131 and 145 respectively movable about a pivot spindle 144 suitably mounted on a slidable obliquely-mounted plate 146 which is adjustably mounted in guides 146*a* on plate 147 affixed on spaced vertical plates 148 attached at their bottom ends to the frame member 30 as is best seen in Figs. 1 and 15. The plate 131 which mounts the bearing sleeve 130 for the scratch brush S, and the plate 145 on which the motor 142 is mounted, are relatively movable about the pivot pin 144 mounted in ears 149 on the plate 146. The plates are, in turn, adjustable with reference to each other by means of adjustment bolts 150 which allow the belts 136 to be tightened as necessary. The position of the scratch brush S is capable of being adjusted in a vertical direction about the pivot pin 144 by a manual control adjusting the relation between a longitudinally moving bar 152 which projects from the lower side of the obliquely-mounted plate 146 to contact cam surfaces 154 integrally-formed on the lower side of the plate 131 on which the scratch brush S is mounted by its shaft 129 as already described. The longitudinally-moving bar 152 is slidably disposed in guides on the upper face of obliquely-mounted plate 146 and is provided at its upward end with an upwardly-projecting ear 156, through which a rod 158 projects and cooperates therewith by a threaded relation, so that by manual manipulation of a hand wheel 160, the bar 152 may be moved longitudinally to change its relative position with the cam surface 154 to thereby adjust the vertical position of the scratch brush S. The rod 158 is journaled in a fixed block 162 adjacent the upper edge of the obliquely-mounted plate 146, against which the hand wheel 160 abuts to allow the adjustment already described.

Figure 19:
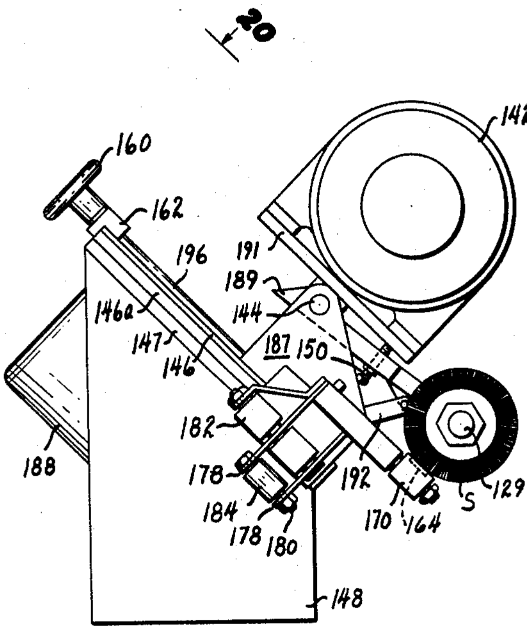
Fig. 19 is an end elevational view from the opposite end of Fig. 18.
Figure 20:
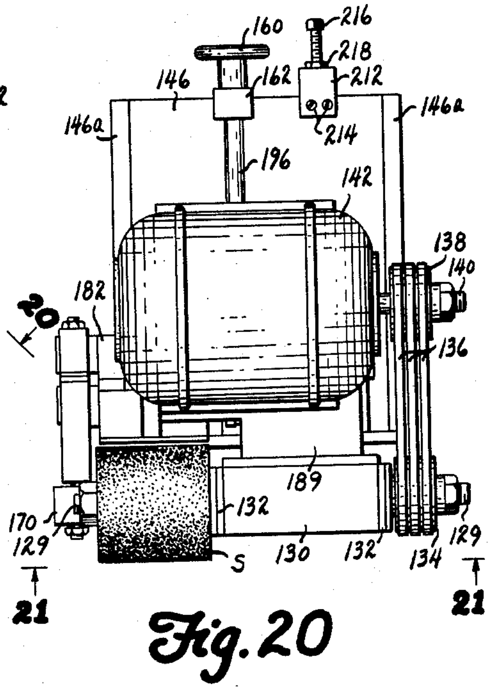
Fig. 20 is a plan view of the device shown in Fig. 19 taken along the line 20—20.
Figures 18, 21:
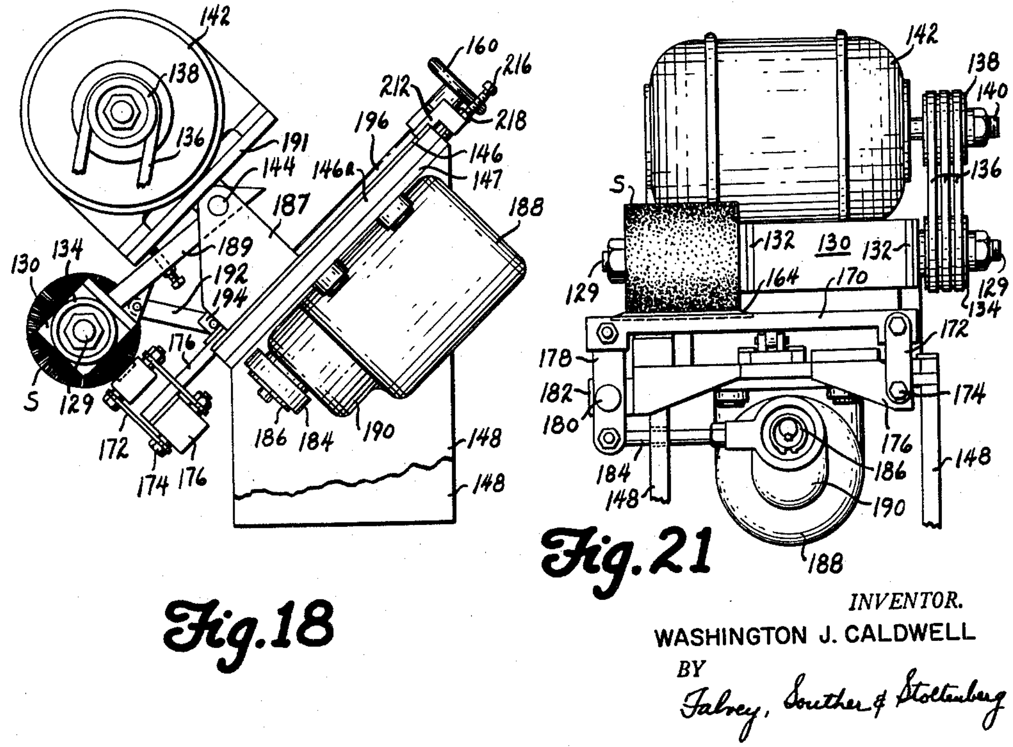
Fig. 18 is an end elevational view of the driving means and operating mechanism for one of the scratch brushes cleansing the upper side of the terminal leads.
Fig. 21 is an elevational view of the device shown in Fig. 20 taken along the line 21—21 of Fig. 20.

When the point of application of the lead to the various sectors of the scratch brush is changed, this adjustment is modified to suit the changed condition as shown in Figs. 18 and 19 as will be described hereinafter. As the group of coils mounted on the holder H is advanced toward station B for the cleansing operation, the leads of the foremost coils, having already been bent to a suitable spreading conformation, so that when they move forwardly under the thrust of the conveyor C on the holder H, they will enter the region of the scratch brush H in substantially tangential relation, as is best seen in Fig. 15. In order to hold the leads in a relatively fixed tangential relation with the scratch brush S, an advancer bar 164 is provided, shown in perspective in Fig. 3. The advancer bar consists of a flat hardened metal plate having a raised or thickened portion adjacent one edge thereof which terminates in tapers at either end, the thickened portion cooperating with the scratch brushes in substantial touching relation. The terminals of the coils, when advancing toward the scratch brush S, are within the locus of the leading taper, and being urged forwardly by the conveyor C, the individual wires of the terminals will engage notches 168 on the raised portion of the bar 164 which separates the terminals to substantially a single layer. Means are provided for mounting the advancer bar 164 for substantial lineal reciprocation in substantially parallel relation with reference to the axis of the scratch brush S which consists of an oscillating bar 170 (Fig. 21) mounted at the rear end on a pair of parallel links 172 adapted to oscillate about the fixed pintle 174 affixed to the forward face of a bracket 176 attached at the lower end of the obliquely-positioned plate 146 already described. There are two modifications of the mounting means for the oscillating bar 170 depending upon the position of the scratch brush S. Differences between the two modifications will be set forth at a suitable point in the description following hereinafter.

The forward end of the oscillating bar 170 (Fig. 21) is mounted on the top end of a centrally-pivoted lever 178 which is adapted to oscillate about a pintle 180 also affixed to a bracket 182 attached to the lower end of the obliquely-mounted plate 146. The opposite end of the lever 178 is attached to a pitman 184 which is reciprocated by an eccentric 186 rotated by a motor 188 through a reduction gear 190. The motor 188 is positioned on the lower side of the obliquely-mounted plate 146 in a suitable manner and adapted to move therewith when adjustment is made. This linkage for oscillating the advancer bar 164 creates a condition relative to the leads of the coils K, whereby the leads will be advanced in a single layer against the periphery of the scratch brush S in substantially a tangential relation therewith, so that the scratch brush, whose bristles are slightly flexed upon contact with the lead, may easily char by frictional heat the enamel insulation previously positioned on the copper wire forming the leads as it advances across the face of the scratch brush. As has already been pointed out, the direction of rotation of the scratch brush is in a direction to apply the forces to the leads in an outwardly direction from the main body of the coil K parallel to the notches 168. The oscillation of the advancer bar 164, combined with the forward motion of the whole group of coils, as positioned on the holder H, causes the individual leads of the coils K to move from one notch to the next continuously, until all of the notches in the advancer bar 164 have been engaged individually by each of the wires during the passage of the coils through the locus of the cleansing operation of the scratch brush S. The fact that the advancer bar reciprocates but yet grips the leads in relatively fixed close proximity to the scratch brush, the bristles of which are flexed by contact with the lead, the insulation on the lead, particularly enamel insulation, is removed therefrom substantially uniformly about its circumference without sharp, gusset-like, uncleaned areas.

For the sake of clarity in describing the machine, it must be pointed out that generally the scratch brushes provided at position B are generally similar to those located at position C except that they operate in reverse relation whereby the remaining uncleansed side of the terminal has the insulation removed therefrom. For example, as indicated in Fig. 15, which is an end elevational view taken from the forward end of the machine where the operator O stands, it will be noted that the scratch brush S, located on the left side of the machine, cleanses the upper side of the left terminal, being positioned relatively above the terminal as is clearly shown. However, the scratch brush located on the right side of the coil cleanses the lower side of the right terminal of insulation, being positioned relatively below, as is also clearly seen in the figure. In other words, the scratch brush, which cleanses the upper side of the lead, contacts the lead with its lower left-hand sector, while the adjacent scratch brush, which cleanses the lower side of the terminal, contacts the terminal in the upper left-hand sector. In position C, these positions of the scratch brush are exactly opposite, so that the remaining uncleansed side of the terminal may make contact with a scratch brush to clean the remaining insulation therefrom.

The construction of the mounting means and also the means for oscillating the advancer bar 164 are the same in each of the relative positions having reference to positions B and C. The scratch brush cleansing the upper side B, being located on the left side as viewed in Fig. 15, is the same as that positioned on the right side in position C when viewed from the same point. Similarly, the scratch brush mounting means for cleansing the lower side of the wire as positioned on the right side, as seen in Fig. 15, is the same as that mounted on the left side at position C when viewed from the same position. The same theory of operation is applied uniformly in all four cleansing positions of the machine, variations, however, are made in the mounting structure in order to compensate for the variations in the space relations, so that the scratch brush may contact the terminal in the proper position to cleanse the insulation from the desired side of the terminal.

Figures 23, 24:
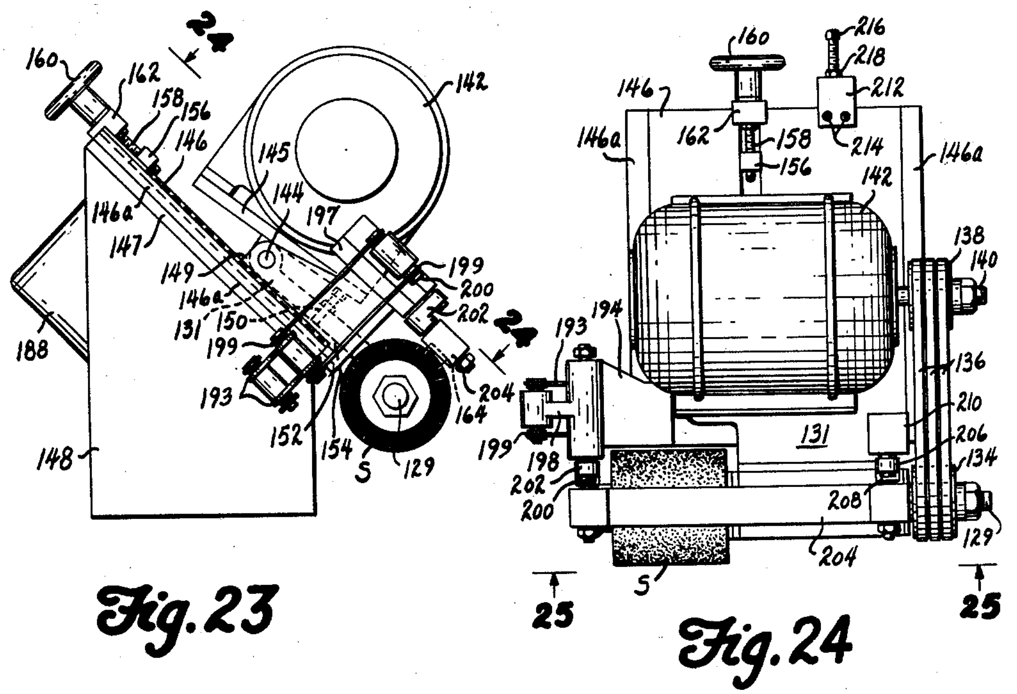
Fig. 23 is an end elevational view from the opposite end of Fig. 22.
Fig. 24 is a plan view of the mechanism shown in Fig. 23 taken along the line 24—24.

For example, the ears 149 which mount the pintle 144, as shown in Fig. 23, are substantially enlarged and heightened in Fig. 15 as indicated by reference numeral 187. In the same manner, variations much be made in the adjustment feature of the plates 131 and 145, as shown in Fig. 23 which correspond to plates 189 and 191 respectively by the inclusion of a link 192 (Fig. 18) which is attached to a shortened slidable member 194 equivalent to bar 152 which is actuated by a lengthened threaded rod 196 operated by hand wheel 160 corresponding to the threaded rod 158 as shown in Fig. 23. These variations in structures of the adjustment features are mechanical equivalents and allow the application of the basic principles of the cleansing operation incorporated in the machine at the different positions therein.

In the same manner, variations occur in the construction of the oscillating means for the advancer bar 164. The construction of the oscillating mechanism shown in Figs. 18, 19, 20 and 21 has already been generally described, all of which operate when the advancer bar 164 is active on the lower side of the scratch brush S to assist in cleansing the upper side of the terminal when contact is made with the scratch brush S.

The oscillating mechanism for oscillating the advancer bar 164 positioned relatively above the scratch brush S is shown in Figs. 22 to 25 inclusive. Referring specifically to Fig. 25, which is comparable to Fig. 21 of the oscillating mechanism already described, the pitman 184 is reciprocated by the same type of motor 188 which operates through the same type of reducing mechanism 190 to rotate the eccentric 186. The left-end of the pitman 184 is connected to a bellcrank 193 which is pivoted on pintle 195 affixed to a projection 197 on the plate 146. The other arm of the bellcrank 193 is attached to a pair of links 199 extending generally upwardly as is best seen in Fig. 23 where they are attached to an arm 198 pivoted on pintle 200 journaled on a portion of the bracket 197 already described. The pintle 200 is provided at its forward end with a crank arm 202, to which is attached plate 204 on the lower side of which the advancer bar 164 is attached in any convenient manner adjacent the periphery of the scratch brush S which is positioned immediately below it, so that the advancer bar 164 cooperates therewith in the upper righthand sector as shown in Fig. 23. The distal end of the plate 204 cooperates with a crank arm 206 which is pivoted on pintle 208 journaled in a suitable bearing in a bracket 210 attached to the upper side of plate 146. Inasmuch as the motor 188 is also attached to the lower side of the plate 146 and both brackets 197 and 210 are attached thereto, the whole assembly may be adjusted by the movement of the plate 146, which is provided with an ear 212 attached by any suitable means, such as screws 214, to the upper edge of the plate 146. The ear 212 is provided with an adjustment screw 216 associated with a lock nut 218, both of which are capable of being manually manipulated to adjust the plate 146 with reference to the frame-work, so that the position of the advancer bar 164 may have its position changed to provide the necessary adjustments therefor.

The bearings associated in all parts of the oscillating mechanisms shown in Figs. 18 to 25 inclusive are formed of a solid rubber body affixed to the various pintles and shafts whereby relatively small angular movements of the elements are made possible by the flexing of the rubber mountings. In this way, the suspension of the elements forming the oscillating mechanisms depend upon stresses and flexures in rubber bodies rather than in any commonly used bearing means. This construction has the advantage that there are no bearing surfaces which are abraded by the grit and dirt which is usually found with scratch brushing operations, so that the life expectancy of the oscillating mechanism will be substantially for the full life of the machine. As has already been pointed out, the rotating bearings, for example, those mounted in the sleeve 130, are protected from grit by means of plates 132 and in the same manner the bearings in motors 142 and 188 are enclosed and protected from intrusion of the abrasive grit.

*Mechanisms at stations D and E*

Having now described scratch brush mechanisms located at positions B and C in the machine, the mechanisms at positions D and E will now be described. The chain conveyor C, which urges the holder H with a large group of coils K positioned thereon, first pushes the holder through position A where the leads are spread apart for cooperation with the scratch brushes at position B, to which the holder H with its coils K proceeds after leaving position A. The scratch brushes at position B on the left side of the coil clean the upper side of the coil terminals (Fig. 15), and also the lower side of the terminals on the right side. The coils on the holder H are urged forwardly by the carrier C and, at the same time, by the advancer bar 164, which is oscillated and shown in perspective in Fig. 3 to be passed by the scratch brushes in substantially, individually separated relation, being held in operative position against the scratch brush by the advancer bar, so that the insulation is removed from substantially one-half or slightly more of the surface of the individual wires, the advancer bar 164 being adjusted to a position where, when running idle, the bristles of the scratch brushes just clear the surface thereof, so that when the individual terminals of the coils K are advanced from one top notch to the next by the reciprocation of the bar, the upper surface away from the notches will be fully exposed to the cleansing action of the scratch brushes S. After all the coils K on the holder H have been processed fully by the scratch brushes at position B, the holder H continuously advances therefrom and enters into the locus of the scratch brushes located at position C. At this point, the relative position of the scratch brushes is diametrically opposite from that at position B, so that the lower side of the left-hand terminal leads (Fig. 15) are cleansed, while the right-hand terminals are having the insulation removed from their upper sides. The mechanisms for advancing the coils past the scratch brushes are substantially identical in construction and action to those described with reference to position B. After the coils have passed through the scratch brushes located at positions B and C, all of the insulation on the terminal leads of the coils have been thoroughly cleansed therefrom for a length of about one and one-half inches.

Thereafter the holder H, with its group of coils, is continuously urged forward at uniform speed into the locus of position D where beaters X and Y are provided (Fig. 16) to bend the coil terminals back from their divergent position at which they passed through the scratch brushing stations B and C to a position where the leads are in substantial vertical position in substantial parallel juxtaposition with reference to each other.

The beaters X and Y travel in a circular orbit as shown in Fig. 16 with the right-hand beater rotating clockwise, while the left-hand beater rotates counter-clockwise, or in such a direction as to urge the wires upwardly and toward the center axis of the coil. The beaters X and Y are mounted on arms 230 which are affixed to the forward face of pulleys 232 and 234 which are mounted on suitable bearings for rotation on a frame-work 236 affixed to the upper surface of the frame-work 30 by any suitable means. The pulleys 232 and 234 are belt-driven by motors 238 and 240 which are positioned above the pulleys as clearly shown. The motors 238 and 240 are mounted on plates 242 and 244 which are pivoted adjacent a central location on a shaft 246 journaled in brackets 248 affixed adjacent the upper surface of the frame-work 30 by any suitable means such as welding. The plates 242 and 244 on which the motors are mounted cooperate with adjustment bolts 250 acting between the upper surface of the frame-work 236 and the bottom side of the plates 242 and 244 whereby the motors 238 and 240 may be raised or lowered by manual manipulation to maintain the proper tension on the driving belts.

The pulleys 232 and 234 rotate the beaters X and Y which are counterbalanced in the directions indicated from positions preferably above the location of the coils K, which are positioned on the holder H and provided with means including rails 60, already described, to move the holder transversely of the axis of rotation of the beaters. As shown in Fig. 16, the right-hand terminal lead of the coil K is shown in solid line in substantially the position which the terminal lead finally assumes after being raised by the beater Y. The terminal lead also is shown in phantom which is the maximum position to which the coil is urged by the beater Y during its action on the terminal lead. The beater Y urges the terminal lead beyond the desired location, so that after the spring-back occurs, the coil lead will return to the position shown in solid line. The beater X acts in the same manner on the right terminal lead.

Figure 29:
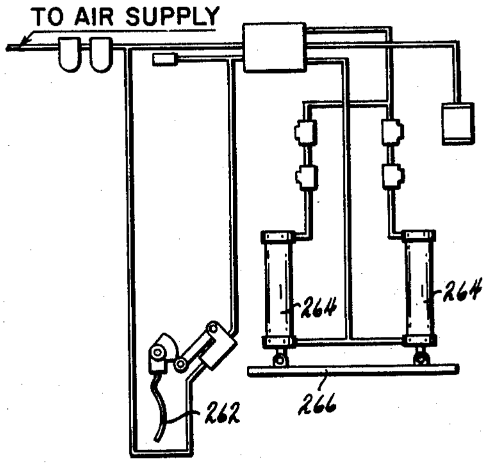

After having the leads straightened by the beaters at position D on the machine, the conveyor C continues to advance the holder H containing the group of coils K mounted thereon until it moves to a point where the pusher lug 52 (Fig. 8) is disengaged from the carrier C by having the chain move downwardly over the sprocket 34 whose location is best seen in Fig. 1. At this point, the holder H remains stationary, and does not move until a second holder H is processed by the machine and pushes the previous holder H from between the guide rails on to a transfer platform 260 (Fig. 26) where the carrier H is stopped just short of a trigger 262 shown in phantom in Fig. 26. The trigger 262, however, is not actuated by the holder H until a third holder is processed through the machine and is carried forward by the carrier H to contact the forward end of the previously processed holder H, which has just been cleared from the carrier C immediately beyond the locus of the sprocket 34, so that the foremost end of the third carrier H will contact the adjacent end of the previously processed second holder which, in turn, will contact the first holder H positioned on the platform 260 and urge it in the same direction until the trigger 262 is tripped to the position shown in solid lines in Fig. 26. The actuation of the trigger 262 by the holder H controls the air supply to a pair of air cylinders 264 in a conventional valving arrangement, shown in Fig. 29, and causes actuation of the pistons of the air cylinders which are connected to a pusher bar 266. The pusher bar engages the side of the holder H and pushes it downwardly as shown in Figs. 26 and 27, or horizontally to the left as viewed from the position of operator O in Fig. 1, so that the holder H is urged against the vertical face plate 268 which forms a stop and predetermines the displacement of the holder H by means of the pusher bar 266 as actuated by the pistons of the air cylinders 264.

At this point, the displaced holder H is moved over a movable platform R which is pivoted on its rear end about bolt 272 affixed to the frame 30 in any convenient manner whereby the weight of the holder H, influenced by gravity, displaces the forward end of the platform R downwardly to the position shown substantially in Fig. 1 so as to cause the holder H to slide down the platform R which then forms, in effect, a ramp, so that it is positioned upon the lower conveyor CL, already described, and moved to the forward end of the machine or to the right as shown in Fig. 1 where it is capable of being conveniently removed from the machine by the operator O. The pusher bar 266 has in the meantime been retracted by the piston of the air cylinders 264 as soon as the holder H has been removed from contact with the trigger 262 which is returned to normal position by spring 262*a*.

Figure 26:
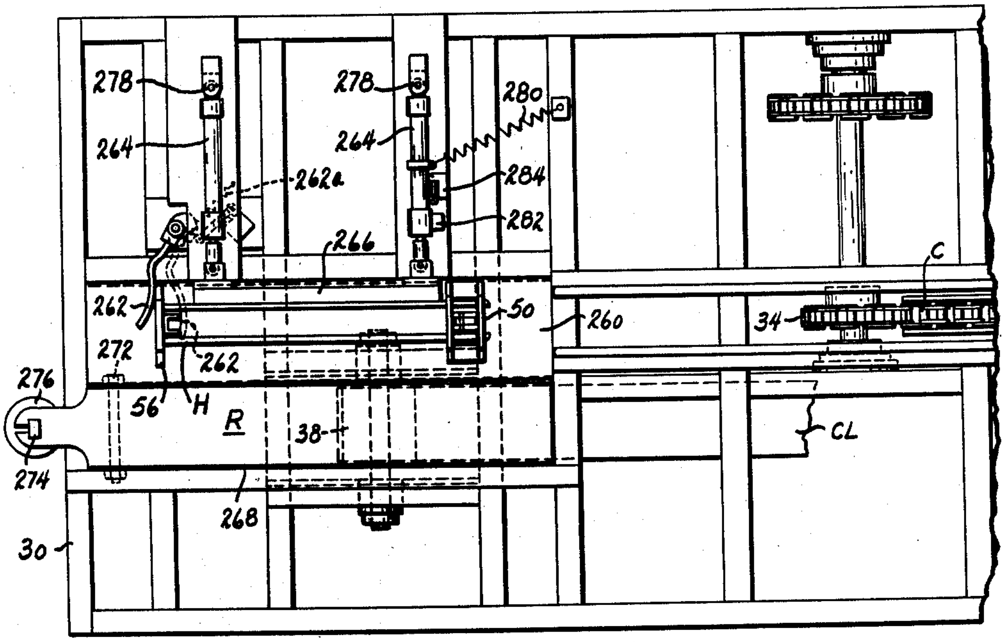
Fig. 26 is a plan view of the transfer mechanism at the rear of the machine taken along the lines 26—26 of Fig. 1.
Figure 27:
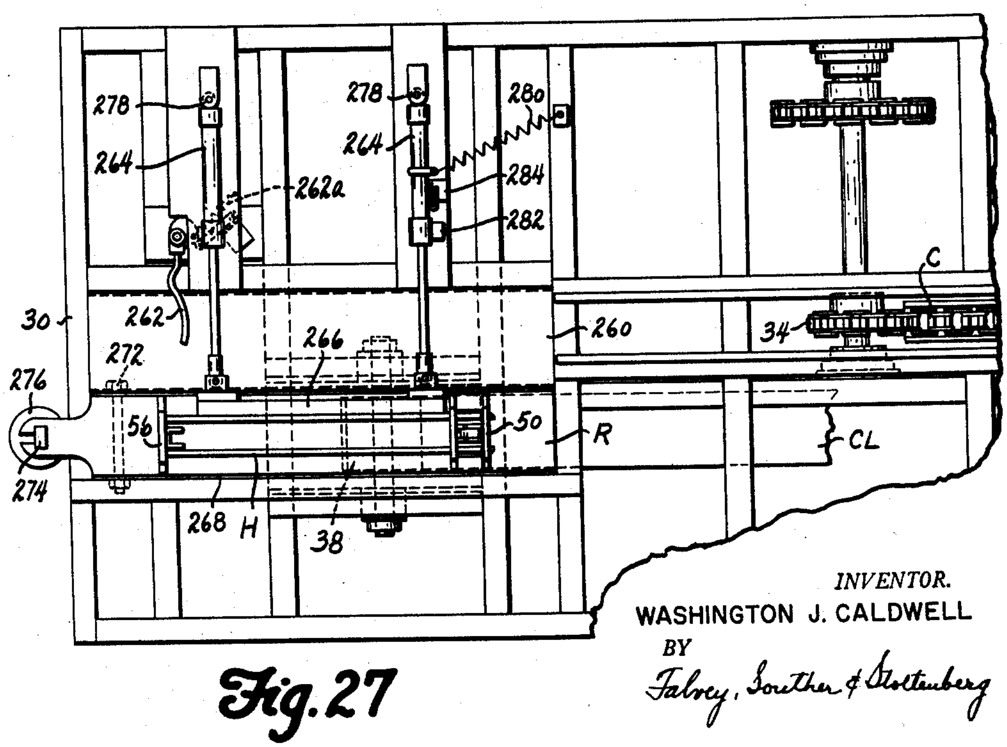
Fig. 27 is a view similar to Fig. 26 showing the transfer mechanism in another operating position.

The ramp R, after the holder H has been discharged therefrom by the conveyor CL, is returned to horizontal position by means of a counter-weight 274 which is attached to the platform R on the other side of the pivot bolt 272 as is best seen in Figs. 26 and 27. For protection, the counter-weight is inclosed in a vertically-positioned tube 276 which is mounted on the floor adjacent the frame member 30, as is best seen in Fig. 1.

The air cylinders 264, which have their piston rods connected together by pusher bar 266, are preferably mounted in pivotal relation about pivot points 278, as is best seen in Figs. 26 and 27, being urged in a counter-clockwise direction by a spring 280 to rest against stop 282 which predetermines the normal operating position of the mechanism. A safety feature is provided by this arrangement inasmuch as in its normal position the right-hand cylinder 264, when positioned against stop 282, actuates a control valve 284 which is effective as a safety measure in the event the air cylinder 264 leaves the stop in any substantial distance by being pushed therefrom by a portion of the holder H to stop the further actuation of the machine until the difficulty has been cleared by the operator.

The machine is suitable for use on a mass production line, with the operator O placing the loaded holders H on the conveyor C, which are returned to him by the lower conveyor CL after having been moved by the machine through the various operational positions of the machine. The operator then moves the holders H from the lower conveyor CL and places the coils K with the cleansed terminals back into the cycles of the mass production line.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a scratch brush machine, a rotating brush having metal bristles extending radially outwardly from the axis of rotation, and means cooperating tangentially in substantially a touching relation with the periphery of the brush, said means being movable in an oscillatory motion for supporting, separating and advancing substantially parallel ends of strands of insulated wire in substantially a single layer transversely across the peripheral face of the rotating brush, the period of time in which the strand ends move across the peripheral face of the brush being so proportioned that the friction between the ends of the strands and the bristles will char the insulation on the strand ends and abrade it therefrom whereby said strand ends are cleansed.

2. In a scratch brush machine, a rotating brush having wire bristles extending radially from the axis of rotation of the brush, supporting and advancing means for parallel ends of strands of insulated wire, cooperating with the periphery of the rotating brush in a tangential plane to support, separate, and move the strand ends across the peripheral face of the rotating brush in substantially a single layer in said tangential plane, said means including an oscillating means moving in a direction parallel to the axis of rotation of the brush, said ends of the strands being advanced by said advancing means at a rate in proportion to the length of the rotating brush so that friction created between the bristles of the brush and the strand ends will char the insulation on the strand ends and abrade it therefrom whereby said ends are cleansed.

3. In a scratch brush machine, a rotating brush having wire bristles extending radially outwardly from the axis of rotation of the brush, and support means including an oscillating plate member with spaced notches positioned in substantial touching relation with the periphery of the rotating brush in a tangential plane for supporting, separating and advancing parallel ends of strands of insulated wire in substantially a single layer across the face of the rotating brush, the relation of the parts being such that the rate of advancing the strand ends with reference to the rotating brush and the pressure against the bristles by the strand ends is such that the friction between the bristles and the strand ends will char the insulation and abrade it therefrom.

4. In a scratch brush machine, a rotating brush having metallic bristles extending radially from the axis of rotation, and means including an oscillatory plate supporting element in substantial touching relation with the periphery of the rotating brush in a tangential plane for supporting, separating, and moving the ends of strands of insulated wire in substantially a single layer across the peripheral face of the rotating brush, the relation of the parts being such that the rate of advancing the strand ends across the face of the rotating brush and the pressure between the bristles of the rotating brush and the ends is such that the friction created between the ends of the bristles and the strand ends is sufficient to char the insulation and abrade it therefrom in a substantial longitudinal direction.

5. In a device of the class described, a rotating scratch brush having bristles projecting outwardly from the axis of rotation, oscillating means movable parallel to the axis of rotation of the scratch brush and in substantial touching relation with the periphery thereof including means transverse of the axis of rotation to support and advance the ends of a series of wires singly past the peripheral face of the scratch brush in substantially tangential relation to make contact therewith, and means to advance the wires in combination with the oscillating means to move the wires into, across and away from the rotating brush.

6. In a device of the class described, a substantially continuously-rotating scratch brush having bristles projecting radially from the axis of rotation, means oscillating parallel to the axis of rotation of the scratch brush including means having a surface transverse of the axis of rotation to support and advance the ends of a series of wires singly past the peripheral face of the scratch brush to make contact therewith tangentially longitudinally of the wire, and conveyor means to advance the wires in combination with the oscillating means to move the wires into, across and away from the brush.

7. In a device of the class described, a substantially continuously-rotating scratch brush having bristles projecting outwardly and terminating in the locus of a cylinder, reciprocating means substantially linearly movable along the axis of rotation of the scratch brush in substantial touching relation therewith including means transverse of the axis of rotating to support and advance a series of wires singly past the peripheral face of the rotating scratch brush to make contact therewith tangentially of the brush and longitudinally of the wire, and conveyor means to advance the wires in combination with the reciprocating means to move the wires into, across and away from the brush.

8. In a device of the class described, a substantially continuously-rotating scratch brush of cylindrical conformation, reciprocating means substantially linearly movable along the axis of rotation of the scratch brush in substantial touching relation including means transverse of the axis of rotation movable therewith to separate, support and advance a series of wires singly past the peripheral face of the rotating scratch brush to make contact therewith tangentially of the brush and longitudinally of the wire, conveyor means to advance the wires in combination with the reciprocating means to move the wires into, across and away from the brush, and power means to drive the various means.

9. In a device of the class described, holder means to hold a series of pre-wound and taped coils in a predetermined position with the terminal leads in the same relative juxtaposition, conveyor means to move the holder with its coils through the device, means cooperating with the holder to bend the terminal leads of the coils to a uniform divergent position with reference to each other, scratch brushes of cylindrical conformation mounted in pairs rotating about an axis parallel to the conveyor means adjacent the locus of the terminal leads, reciprocating means adapted to move substantially parallel to the conveyor means in substantial touching relation with the periphery of each of the brushes including means to separate the terminal leads of the coils into a single-layer when applied to the brush, and means to bend the terminal leads to a substantially parallel relation.

10. In a device of the class described, holder means to hold a series of pre-wound and taped coils in a predetermined position with the terminal leads in the same relative juxtaposition, conveyor means to move the holder wtih its coils through the device, means cooperating with the holder to bend the terminal leads of the coils to a uniform divergent position with reference to each other, four scratch brushes of cylindrical conformation mounted in pairs rotating about an axis parallel to the conveyor means adjacent the locus of the terminal leads, reciprocating means adapted to move substantially parallel to the conveyor means in substantial touching relation with the periphery of each of the brushes including means to separate the terminal leads of the coils into a single layer when applied to the brush, means to bend the terminal leads to a substantially parallel relation after passing the scratch brushes, and power means to drive the various means.

11. In a device of the class described, holder means to hold a series of pre-wound and taped coils in a predetermined position with the terminal leads in the same relative juxtaposition, conveyor means to move the holder with its coils through the device, means on the device cooperating with the holder to bend the terminal leads of the coils from a convergent relation to a uniform divergent position with reference to each other, four scratch brushes of cylindrical conformation mounted in pairs rotating about an axis parallel to the conveyor means adjacent the locus of the terminal leads, four reciprocating means adapted to move substantially linearly parallel to the conveyor means in substantial touching relation with the periphery of each of the brushes including means to separate the terminal leads of the coils into single layer and advance the separated leads through the cleansing area of the brush, means to bend the terminal leads thereafter to a substantially parallel relation, and power means to drive the various means of the device.

12. In a device of the class described, holder means to hold a series of pre-wound and taped coils in a predetermined position with the terminal leads in the same relative juxtaposition, conveyor means to move the holder with its coils through the device, means on the device cooperating with the holder to bend the terminal leads of the coils from a random converging relation to a uniform divergent position with reference to each other and the body of the coil, four scratch brushes of cylindrical conformation mounted in pairs substantially continuously rotating about an axis parallel to the conveyor means adjacent different loci of the terminal leads as moved by the conveyor means, four reciprocating means adapted to move substantially linearly parallel to the conveyor means in substantial touching relation with the periphery of each of the brushes including transverse slot means to separate the terminal leads of the coils into a single layer and advance the leads from slot to slot across the face of the scratch brush when the wires are applied to the brush, means to bend the terminal leads thereafter to a substantially parallel relation, a second conveyor means to return the holder to a position adjacent the initial position, and power means to drive the various means of the device.

References Cited in the file of this patent

UNITED STATES PATENTS

| | | |
|---|---|---|
| 687,542 | Paelke | Nov. 26, 1901 |
| 963,247 | Pfouts | July 5, 1910 |
| 1,072,902 | Benedict | Sept. 9, 1913 |
| 1,424,482 | Janell | Aug. 1, 1922 |
| 1,970,031 | Collins | Aug. 14, 1934 |
| 2,082,991 | Turco | June 8, 1937 |
| 2,531,009 | Stewart et al. | Nov. 21, 1950 |
| 2,724,136 | Sheley et al. | Nov. 22, 1956 |
| 2,770,079 | Baumgartner | Nov. 13, 1956 |

FOREIGN PATENTS

| | | |
|---|---|---|
| 297,560 | Great Britain | Sept. 27, 1928 |